Patented June 25, 1940

2,205,565

UNITED STATES PATENT OFFICE 2,205,565

EXTRACTION OF METALS

Alan Kissock, Laurelton, N. J.

No Drawing. Application May 23, 1939,
Serial No. 275,183

6 Claims. (Cl. 75—119)

This invention relates to the extraction of nickel, cobalt and copper, singly or together as present in sulphide ores thereof, and to the separation of these metals from iron and other minerals with which they may be associated.

Present treatment of these ores ordinarily consists of mechanical concentration followed by one or more roasting and other smelting and metallurgical operations in order to separate and recover the commercially useful metals. By the method herewith disclosed nickel, cobalt and copper may be extracted in the form of soluble salts from the crude sulphide ore, concentrate, or partially roasted concentrate thereof by a single hydrometallurgical step and thus in simple procedure effect efficiency and economy over present practice. Other objects of the invention will become apparent.

I have found that by subjecting sulphide ores of nickel, cobalt and copper, either chemically combined or physically associated with sulphides of iron, to the action of an aqueous solution of a chlorine mon-oxy acid, as for instance hypochlorous acid or to a chlorine monoxide derivative, or salt of hypochlorous acid, for example sodium hypochlorite, that it is possible, at normal temperatures and pressures, to preferentially oxidize these sulphides to water soluble sulphates thus permitting separation of the nickel, cobalt and copper from a greater proportion of the iron and recovery of these metals one from the other by any of several well known means.

It will be understood that this invention is in no way limited to sodium hypochlorite which is indicated descriptively hereafter only for simplicity and because it may be considered to be characteristic of the action of similar derivatives or salts of chlorine monoxide such for example as hypochlorous acid or the hypochlorites of potassium, calcium, barium and other like compounds. The mon-oxy acids and monoxide salts of other halogens, as for example those of bromine and iodine, produce similar results but their cost is ordinarily prohibitive for use for the purpose herewith.

In further detailed description of my process I may select, for example a pyritic or sulphide ore of nickel, cobalt, copper and iron because it is thus illustrative of the conditions when each, or all of the metals involved are concerned. The crude ore as mined, its concentrate or a partially roasted concentrate therefrom is ground in, or ground and subsequently subjected to, an aqueous solution of sodium hypochlorite with, for example 0.5% available oxygen content although this may be greater or less according to the ore under treatment. At normal temperatures and pressures the available oxygen of the hypochlorite is liberated in nascent condition, attacks the sulphides and stated in simplest form converts substantially all of those of nickel, cobalt and copper but only partially those of iron, into soluble sulphates and itself reverts to chloride. When any of the metals are combined with more than one molecule of sulphur, which for example is frequently true of iron, the additional molecule of sulphur or any portion of it may be oxidized to sulphuric acid which then reacts with the hypochlorite, or the free chloride and alkali normally present in hypochlorites, according to any of the following equations:

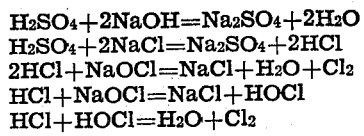

$$H_2SO_4 + 2NaOH = Na_2SO_4 + 2H_2O$$
$$H_2SO_4 + 2NaCl = Na_2SO_4 + 2HCl$$
$$2HCl + NaOCl = NaCl + H_2O + Cl_2$$
$$HCl + NaOCl = NaCl + HOCl$$
$$HCl + HOCl = H_2O + Cl_2$$

The formation of these acids is an important feature of my process. Although additions of acid or alkali may be made as desired it is ordinarily possible by proper adjustment of time of contact, fineness of the ore and amount and strength of hypochlorite employed to at all times control the hydrogen ion concentration at that point which is best suited for any particular ore.

Since hypochlorites are stable only in alkaline solution they normally contain a proportion of free alkali, as for example sodium hydroxide, and may therefore be made up to any predetermined pH value. Because the oxygen content of a hypochlorite only remains available while its solution is alkaline it is important, when first applied to an ore that it have a high enough pH value, for example from 10 to 12, and be in sufficient quantity to provide the amount of oxygen required while alkalinity is maintained to oxidize all of the sulphides of nickel, cobalt and copper, together with a proportion of those of iron present in the ore, to sulphates before the solution can become sufficiently acid to prevent further oxidation due to destruction of hypochlorite with liberation of free chlorine. As the metallic sulphides are converted to sulphates they are therefore immediately precipitated as hydrates by the free alkali present. If hypochlorous acid alone is used the sulphates are not precipitated unless the solution is made basic by the addition of an alkali.

I have found that although ordinarily present in the ore in much greater percentages than nickel, cobalt and copper that not more than 50% of the iron sulphides are attacked when substantially all of those of nickel, cobalt and copper have been oxidized to sulphates. This preferential attack of the hypochlorite, or hypochlorous acid, on the sulphides of nickel, cobalt and copper over iron is supplemented by a second differential which appears at this stage of my process.

The hydrates of nickel and cobalt obtained as described react with hypochlorites to form sesqui-oxides, which in the presence of hypochlorites undergo rapid alternate reduction and oxidation with the evolution of oxygen, thus for simplicity:

$$Ni_2O_3 + NaOCl \rightleftharpoons NaCl + 2NiO + O_2$$

This formation of sesqui-oxides is an important feature of my process in that acting as catalysts and liberating oxygen from hypochlorites they thus aid in the oxidation of further sulphide ore. Copper sulphate in the presence of hypochlorites may be precipitated either as cupric hydrate or as an oxy-chloride and that proportion of the total iron sulphide present which has been oxidized to sulphate is precipitated and remains as ferric hydrate.

The reactions occurring at this stage may be expressed by chemical equations which, it will be understood are shown in their simplest form. The principals disclosed are as described irrespective of the complexity either of any intermediate reactions or of the sulphides that may be present in the ore.

$$NiS + 4NaOCl = NiSO_4 + 4NaCl$$
$$NiSO_4 + 2NaOH = Ni(OH)_2 + Na_2SO_4$$
$$2Ni(OH)_2 + NaOCl = Ni_2O_3 + NaCl + 2H_2O$$

The reactions for cobalt are similar to those of nickel.

$$CuS + 4NaOCl = CuSO_4 + 4NaCl$$
$$CuSO_4 + 2NaOH = Cu(OH)_2 + Na_2SO_4$$

The iron sulphides which are attacked may react as follows:

$$FeS + 4NaOCl = FeSO_4 + 4NaCl$$
$$2FeS_2 + 15NaOCl + H_2O =$$
$$Fe_2(SO_4)_3 + H_2SO_4 + 15NaCl$$
$$Fe_2(SO_4)_3 + 6NaOH = 2Fe(OH)_3 + 3Na_2SO_4$$

As the sulphides of nickel, cobalt, copper and iron are thus being oxidized to sulphates and immediately converted to sesqui-oxides and hydrates, the sulphuric acid resulting from oxidation of the additional molecule of pyritic sulphur is constantly lowering the pH value of the solution. This continues, under control by means of time of contact, degree of fineness of the ore, amount and available oxygen content and alkalinity of the hypochlorite such as to insure efficient extraction of the nickel, cobalt and copper before the pH of the solution has been brought down to that point at which the sesqui-oxides of nickel and cobalt, the hydrate or oxy-chloride of copper and part of the ferric hydrate, are redissolved as sulphates. Beyond this point any remaining active acidity is consumed by liberating chlorine from hypochlorite in preference to solution of additional ferric hydrate and an equilibrium is reached. These reactions may be expressed as follows:

$$2Ni_2O_3 + 4H_2SO_4 = 4NiSO_4 + 4H_2O + O_2$$
$$2Co_2O_3 + 4H_2SO_4 = 4CoSO_4 + 4H_2O + O_2$$
$$Cu(OH)_2 + H_2SO_4 = CuSO_4 + 2H_2O$$
$$2Fe(OH)_3 + 3H_2SO_4 = Fe_2(SO_4)_3 + 6H_2O$$
$$H_2SO_4 + 2NaCl = Na_2SO_4 + 2HCl$$
$$2HCl + NaOCl = NaCl + H_2O + Cl_2$$

At this stage of the process the pH of the solution may be approximately from 2 to 3 which value I have found that whereas substantially all of the nickel, cobalt and copper are in solution as sulphates only a small proportion of the ferric hydrate is redissolved and held in solution as ferric sulphate. The bulk of the iron sulphides, ordinarily predominate in these ores, is therefore either originally unattacked or that which has been oxidized to sulphate and precipitated as hydrate remains relatively insoluble, together with any gangue and other minerals, and separation from the soluble sulphates of nickel, cobalt and copper is easily accomplished by filtration or decantation. Since, as disclosed ferric sulphate is with difficulty held in solution at the pH indicated and whereas at this value nickel, cobalt and copper sulphates are easily soluble such iron as may remain in solution with these metals may alone be precipitated by hydrolysis, or by the addition of an alkali carbonate, for example, calcium carbonate.

Having thus extracted a relatively pure solution containing the sulphates of nickel, cobalt and copper, singly or together as they were present in the ore, these metals may then be separated and recovered by selective precipitation, as for example copper on metallic iron, by crystallization, electrolysis or by any other known and suitable method.

As an alternative to adjustment of pH control to effect resolution of the precipitated sesqui-oxides and hydrates by sulphuric acid as described, it may with some ores be preferable to maintain alkalinity throughout at a point above that at which the metallic precipitates, resulting from oxidation of the sulphides in alkaline solution, become soluble and to separate them together with any gangue and unattacked sulphides from the solution by means of filtration or decantation. The residue thus containing all of the metallic content originally present in the ore, but in different form, namely sesqui-oxides, hydrates and unattacked sulphides as described, may then be treated with a solution, for example, of ammonia, in which the compounds of nickel, cobalt and copper but not those of iron, are soluble. In this manner it is also possible to separate nickel, cobalt and copper free from iron and in addition by thus first removing the original ore leaching solution eliminate any building up of sodium salts, such as sulphate and chloride, which may complicate subsequent metal recovery.

It will be noted from the reactions shown using, for example, sodium hypochlorite that sodium sulphate and sodium chloride are resultant products both from oxidation of the sulphides as well as from other and intermediate reactions. These salts may be separated by crystallization obtaining sodium sulphate as a by-product and sodium chloride which may be electrolysed, without diaphragm, to regenerate hypochlorite. The process may therefore be cyclic up to the point to which such practice is economic.

The process disclosed provides for the oxidation of metallic sulphide sulphur by means of an aqueous solution of hypochlorous acid or its salts. It will be obvious therefore that, when desired, less oxygen need thus be furnished if the ore or concentrate be given a preliminary partial, or low temperature, roast, more particularly to remove a portion of the sulphur which is combined with the iron ordinarily predominate in sulphide ores of nickel, cobalt and copper. It is known that iron sulphides are oxidized by roasting in air at from 700 to 900 degrees Fahrenheit whereas at this temperature the sulphides of nickel, cobalt and copper are relatively unattacked. It is necessary that the roast not be carried so far but that the nickel, cobalt and copper retain at least one molecule of sulphur and the sulphides, or sulphates, of these metals together with those of any fully unoxidized iron sulphides thus remaining in the calcine may be subsequently oxidized with a lesser amount of an aqueous solution of hypochlorous acid or its salts and exactly in the manner disclosed.

It will be recognized by those skilled in the art that by means of this invention it is possible to extract, free from iron, substantially all of the nickel, cobalt and copper from sulphide ores of these metals in one relatively simple chemical step which is easily adaptable to usual hydrometallurgical operative practice.

The terms used in describing and claiming the invention have been used in their descriptive sense and not as terms of limitation and it is intended that all equivalents of the terms used be included within the scope of the appended claims.

I claim:

1. A method of extracting nickel or cobalt by the direct oxidation of their sulphides in an aqueous solution containing one or more derivatives of chlorine monoxide.

2. A method of extracting nickel or cobalt by the direct oxidation of their sulphides in an aqueous solution containing a hypochlorite.

3. A method of extracting nickel or cobalt by the direct oxidation of their sulphides in an aqueous solution containing sodium hypochlorite.

4. A method of extracting nickel or cobalt by the direct oxidation of their sulphides in an aqueous solution containing hypochlorous acid.

5. A method of extracting nickel or cobalt by the direct oxidation of their sulphides in an aqueous solutin in which one or more derivatives of chlorine monoxide alone provide a soluble salt of these metals.

6. A method of extracting nickel or cobalt and copper when it is associated therewith by the direct oxidation of their sulphides in an aqueous solution in which one or more derivatives of chlorine monoxide alone provide a soluble salt of these metals.

ALAN KISSOCK.